(12) United States Patent
Hermann et al.

(10) Patent No.: US 8,293,393 B2
(45) Date of Patent: Oct. 23, 2012

(54) APPARATUS FOR THE EXTERNAL APPLICATION OF BATTERY PACK ENCAPSULANT

(75) Inventors: Weston Arthur Hermann, Palo Alto, CA (US); Scott Ira Kohn, Redwood City, CA (US); Noel Jason Mendez, Mountain View, CA (US); Ernest Matthew Villanueva, San Mateo, CA (US); Alexander Thomas Jacobs, Redwood City, CA (US); Peng Zhou, El Cerrito, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/434,115

(22) Filed: Mar. 29, 2012

(65) Prior Publication Data
US 2012/0183826 A1 Jul. 19, 2012

Related U.S. Application Data

(62) Division of application No. 12/315,303, filed on Dec. 2, 2008, now Pat. No. 8,216,502.

(51) Int. Cl.
*H01M 2/10* (2006.01)
*H01M 2/02* (2006.01)
(52) U.S. Cl. ............... 429/99; 429/177; 429/186
(58) Field of Classification Search .......... 429/99, 429/177, 186
See application file for complete search history.

(56) References Cited

U.S. PATENT DOCUMENTS

| | | | |
|---|---|---|---|
| 5,288,564 A | 2/1994 | Klein et al. | |
| 5,298,347 A | 3/1994 | Aksoy et al. | |
| 5,736,271 A | 4/1998 | Cisar et al. | |
| 5,907,477 A | 5/1999 | Tuttle et al. | |
| 5,989,300 A | 11/1999 | Eshraghi | |
| 6,410,185 B1 | 6/2002 | Takahashi et al. | |
| 6,899,975 B2 | 5/2005 | Watanabe et al. | |
| 7,229,712 B2 | 6/2007 | Eshraghi et al. | |
| 7,531,270 B2 * | 5/2009 | Buck et al. | 429/120 |
| 8,173,295 B2 * | 5/2012 | Villanueva et al. | 429/159 |
| 2004/0202927 A1 | 10/2004 | Drea et al. | |
| 2007/0218353 A1 * | 9/2007 | Straubel et al. | 429/120 |
| 2009/0023060 A1 | 1/2009 | Villanueva et al. | |
| 2011/0076538 A1 * | 3/2011 | Kreiner et al. | 429/99 |

FOREIGN PATENT DOCUMENTS

| | | |
|---|---|---|
| JP | 3190052 A | 8/1991 |
| WO | WO-02/09212 A1 | 1/2002 |
| WO | WO 2009/012036 A1 | 1/2009 |

* cited by examiner

*Primary Examiner* — Yogendra Gupta
*Assistant Examiner* — Jeremiah Smith
(74) *Attorney, Agent, or Firm* — Patent Law Office of David G. Beck

(57) ABSTRACT

An apparatus for simplifying battery pack encapsulation is provided. The battery pack includes a pair of complementary housing members with each housing member including a plurality of cell constraints into which the ends of corresponding battery cells are inserted during assembly. One or both housing members also include at least one, and preferably a plurality, of raised encapsulant injection ports. The raised encapsulant injection ports are designed to extend above the surface of the respective housing members and beyond the injected encapsulation material, thus ensuring that the ports remain open after encapsulation material injection.

14 Claims, 4 Drawing Sheets

APPARATUS FOR THE EXTERNAL APPLICATION OF BATTERY PACK ENCAPSULANT

CROSS-REFERENCE TO RELATED APPLICATION

This application is a divisional of U.S. patent application Ser. No. 12/315,303, filed 2 Dec. 2008, the disclosure of which is incorporated herein by reference for any and all purposes.

FIELD OF THE INVENTION

The present invention relates generally to battery packs and, more particularly, to an apparatus for efficiently encapsulating a plurality of battery cells within a battery module.

BACKGROUND OF THE INVENTION

Battery packs, also referred to as battery modules, have been used for years in a variety of industries and technologies that include everything from portable electric tools and laptop computers to small hand-held electronic devices such as cell phones, MP3 players, and GPS units. In general, a battery pack is comprised of multiple individual batteries, also referred to as cells, contained within a single piece or multi-piece housing. Single piece housings are often comprised of shrink-wrap while multi-piece housings often rely on a pair of complementary housing members that are designed to fit tightly around the cells when the housing members are snapped or otherwise held together. Typically a conventional battery pack will also include means to interconnect the individual cells as well as circuitry to enable charging and/or to protect against overcharging.

Battery packs offer a number of advantages over the use of individual battery cells. From the end user's perspective, combining multiple cells into a single housing simplifies battery removal, replacement and/or battery recharging, since the user is only required to deal with a single unit. From the manufacturer's perspective, the use of battery packs provides additional marketing flexibility. For example, a manufacturer may offer a variety of interchangeable battery packs at different price points for the same device(s), the different battery packs providing different capacities, cell types (e.g., lithium ion versus nickel-metal-hybrid), or other variations. A manufacturer may also find it advantageous to market multiple devices that all utilize a single, interchangeable battery pack.

Recent advances in the development of hybrid and electric vehicles have lead to the need for a new type of battery pack, one capable of housing tens to hundreds of individual cells and surviving the inherent thermal and mechanical stresses of a car for a period of years. Additionally, while the housing used to package a multi-cell vehicle battery must be structurally sound enough to allow battery pack inspection and/or replacement, it must do so with minimal weight since hybrids and electric cars are exceptionally sensitive to excess weight. Lastly, the design of a vehicle battery pack should lend itself to efficient, and preferably automated, manufacturing practices. The present invention provides such a battery pack.

SUMMARY OF THE INVENTION

The present invention provides a simplified encapsulation technique for manufacturing battery packs. In accordance with the invention, the battery pack includes a pair of complementary housing members with each housing member including a plurality of cell constraints into which the ends of corresponding battery cells are inserted during assembly. One or both housing members also include at least one, and preferably a plurality, of raised encapsulant injection ports. The raised encapsulant injection ports are designed to extend above the surface of the encapsulation material, thus ensuring that the ports remain open after injection of the encapsulation material.

In at least one embodiment of the invention, the battery pack is comprised of (i) a first housing member with an interior surface that includes at least one first housing member raised encapsulant injection port and a plurality of cell mounting wells adapted to receive a first end of a plurality of corresponding battery cells; (ii) a second housing member with an interior surface that includes at least one second housing member raised encapsulant injection port and a plurality of cell mounting wells adapted to receive a second end of a plurality of corresponding battery cells; and (iii) a plurality of battery cells. The battery pack further comprises a first layer of encapsulation material surrounding the perimeter of the first end of each battery cell and a second layer of encapsulation material surrounding the perimeter of the second end of each battery cell, wherein an end section of the at least one first housing member raised encapsulant injection port extends beyond the first layer of encapsulation material and an end section of the at least one second housing member raised encapsulant injection port extends beyond the second layer of encapsulation material. The interior edge of each cell mounting well may be chamfered. Each cell mounting well may include at least one through hole. The first and second housing may be secured together by bonding or with at least one latching mechanism. Alternately, upon assembly a gap may exist between the two housing members.

In at least one embodiment of the invention, the battery pack is comprised of (i) a first housing member with an interior surface that includes a plurality of first housing member raised encapsulant injection ports and a plurality of cell constraints adapted to receive a first end of a plurality of corresponding battery cells; (ii) a second housing member with an interior surface that includes a plurality of cell constraints adapted to receive a second end of a plurality of corresponding battery cells; (iii) a plurality of battery cells; and (iv) a first layer of encapsulation material surrounding the perimeter of the first end of each battery cell and a second layer of encapsulation material surrounding the perimeter of the second end of each battery cell, wherein an end section of each of the plurality of first housing member raised encapsulant injection ports extends beyond the first layer of encapsulation material. The second housing member interior surface may further include a plurality of second housing member raised encapsulant injection ports, wherein an end section of each of the plurality of second housing member raised encapsulant injection ports extends beyond the second layer of encapsulation material. The first and second pluralities of cell constraints may be comprised of first and second pluralities of cell mounting wells, respectively, in which case the interior edge of each cell mounting well may be chamfered. The first and second housing may be secured together or, upon assembly, a gap may exist between the two housing members.

A further understanding of the nature and advantages of the present invention may be realized by reference to the remaining portions of the specification and the drawings.

DESCRIPTION OF THE SPECIFIC EMBODIMENTS

In the following text, the terms "battery", "cell" and "battery cell" may be used interchangeably and may refer to any of a variety of different cell types and configurations including, but not limited to, lithium ion, lithium ion polymer, nickel metal hydride, nickel cadmium, nickel hydrogen, alkaline, or other battery type/configuration. Similarly, the terms "encapsulant" and "encapsulation material" refer to any of a variety of different single and multi-component resins and adhesives that can be used to fix the battery cells within the battery pack as described in detail below, the encapsulation material being comprised of any of a variety of materials including, but not limited to, silicon based encapsulants, polyurethane based encapsulants, epoxy based encapsulants, and other encapsulation materials. Depending upon the specific design of the intended battery pack, the encapsulant may have any of a variety of characteristics in addition to those required to fix the cells into the battery pack housing members, characteristics such as thermal conductivity, electrical non-conductivity, etc. Additionally, the accompanying figures are only meant to illustrate, not limit, the scope of the invention and should not be considered to be to scale.

Figure 1:
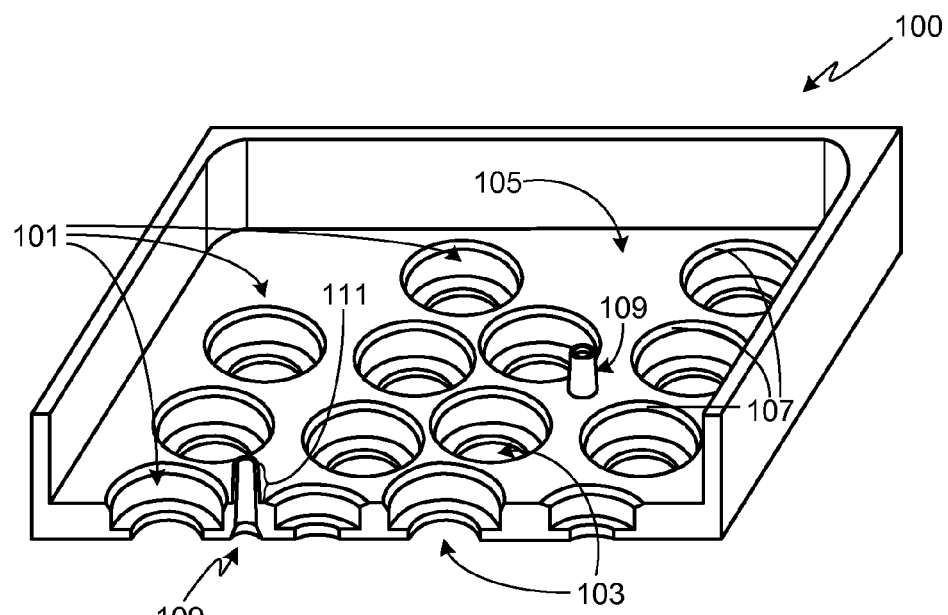
FIG. 1 illustrates a portion of a lower battery pack housing member, this view providing both a perspective view of the member as well as a cross-sectional view of some of the plurality of battery cell mounting wells designed into the battery pack housing member.

FIG. 1 illustrates a portion of a lower battery pack housing member 100, this view providing both a perspective view of member 100 as well as a cross-sectional view of some of the plurality of battery cell mounting wells 101. It will be appreciated that the present invention is not limited to a particular number of cell mounting wells or cells, nor is the invention limited to a particular cell packing density or cell layout.

Preferably each cell mounting well 101 is designed to accommodate a single battery cell, although it will be appreciated that the cell wells can be designed to accommodate sub-groups of battery cells while still taking advantage of the benefits of the present invention. In the preferred embodiment of the invention, each mounting well within either the lower battery pack housing member or the upper battery pack housing member, or both, includes a through hole 103 at the bottom of the well. Through holes 103 provide access to the battery cells after the cells have been mounted within the wells, thus allowing a point of contact for mounting a wiring harness or other electrical contact means. Alternate configurations may include a wiring harness integrated within the housing member, thus eliminating the need for through holes 103.

In the illustrated embodiment, the edge of each mounting well 101 that intersects the inside bottom surface 105 of the housing member is chamfered. Chamfer 107 provides several benefits. First, it can be used to help guide the individual cells into the corresponding mounting wells 101 during the assembly process. Second, for a given level of encapsulation material, chamfer 107 increases the bonding area surrounding each cell, thus potentially leading to improved cell bonding. Third, chamfer 107 helps to wick encapsulant around the perimeter of the cells, thereby improving bonding and allowing the designer to utilize less encapsulant to achieve the desired level of bond strength. It will be appreciated that decreasing the quantity of encapsulant yields both weight and cost savings.

Figure 2:
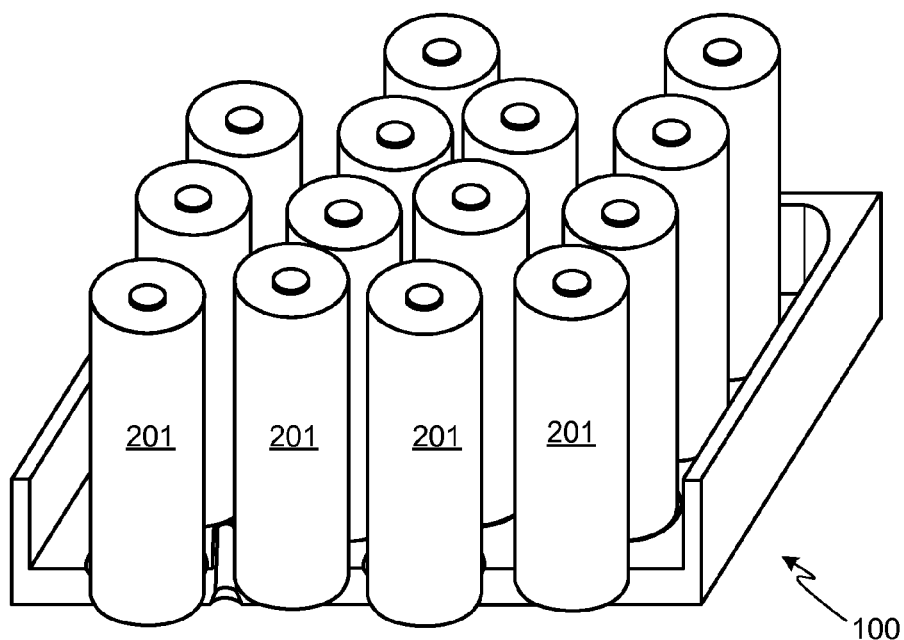
FIG. 2 illustrates the same portion of the lower battery pack housing member shown in FIG. 1, with the addition of battery cells inserted into the cell mounting wells.

FIG. 2 illustrates the same portion of lower battery pack housing member 100 that is shown in FIG. 1. In this figure, however, cells 201 are shown inserted within cell mounting wells 101. As previously noted, although preferably cells 201 are cylindrical as shown, the invention is also suitable for use with non-cylindrical cells, for example rectangularly-shaped cells (not shown). It should also be understood that while the preferred embodiment of the invention utilizes cell wells to hold the cells in place within the housing members during encapsulation, the inventors envision the use of other means to constrain the cells. For example, the cell mounting wells can be replaced by other forms of cell constraints, e.g., posts, ribs, etc., that are located on surface 105 of the housing member and surround a sufficient portion of the cell ends to constrain the cells during the encapsulation process.

Figure 3:
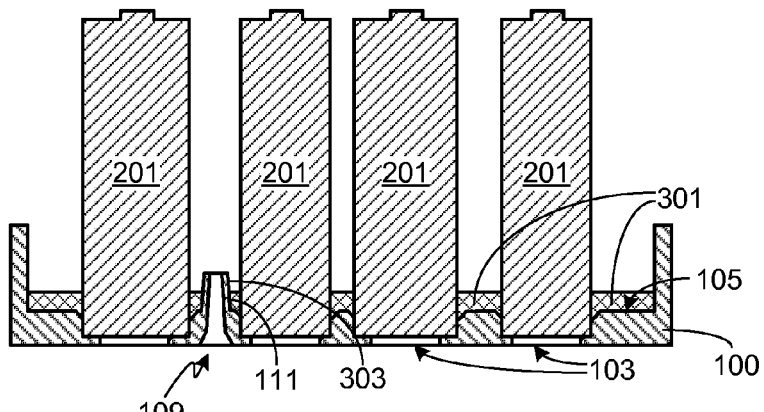
FIG. 3 is a cross-sectional view of the lower battery pack housing member and battery cells shown in FIG. 2, with the addition of a layer of encapsulation material that surrounds the perimeter of the base portion of each cell.

FIG. 3 is a cross-sectional view of lower battery pack housing member 100 and battery cells 201. As shown in this figure, encapsulation material 301 surrounds the perimeter of the base portion of each cell 201. As a result of encapsulant 301, each cell 201 is securely bonded to housing member 100. Although the primary purpose of encapsulation material 301 is to securely bond each cell 201 to the housing member, preferably, and as shown, sufficient encapsulant is added to completely cover the bottom surface 105 of the member, thereby providing a more structurally sound support for cells 201.

FIGS. 1-3 illustrate another aspect of the invention, specifically raised encapsulant injection ports 109. Ports 109 are not simply through holes bored through surface 105 of housing member 100. Rather, each port 109 includes a portion 111 that extends beyond surface 105 to a sufficient height to ensure that raised portion 111 is not completely covered or obstructed by encapsulant 301 during the encapsulation steps, thereby ensuring that port 109 remains open. This aspect of a port 109 is illustrated in FIG. 3, which shows the end section 303 of raised port portion 111 extending above the top surface of encapsulant 301.

It should be understood that although FIG. 1 shows a pair of ports 109 and the view in FIGS. 2 and 3 only show a single port 109, in a typical application of the invention a housing member would include a plurality of ports 109. By including multiple ports 109 the encapsulant only has to flow over a relatively small region of the housing surface and surround only a few cells, thus allowing the selection of a particular encapsulant to be based on a variety of considerations rather than simply emphasizing viscosity. In one embodiment, each housing member includes between 1 and 10 ports 109. In another embodiment, each housing member includes between 10 and 100 ports 109. In yet another embodiment, each housing member includes more than 100 ports 109.

Figure 4:
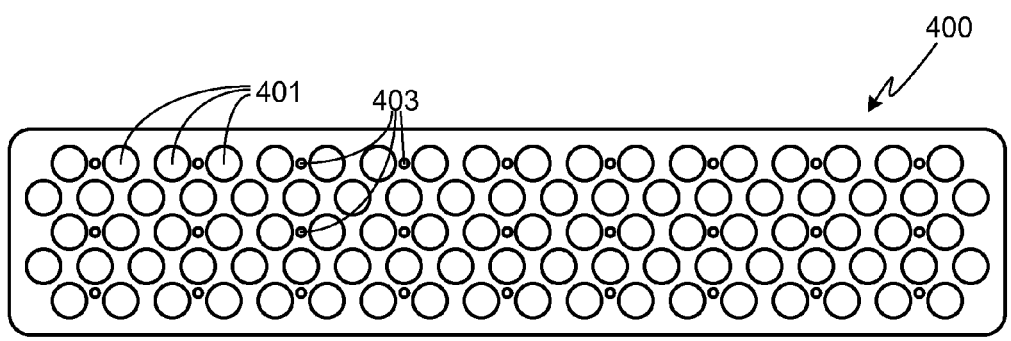
FIG. 4 illustrates a complete housing member.
Figure 5:
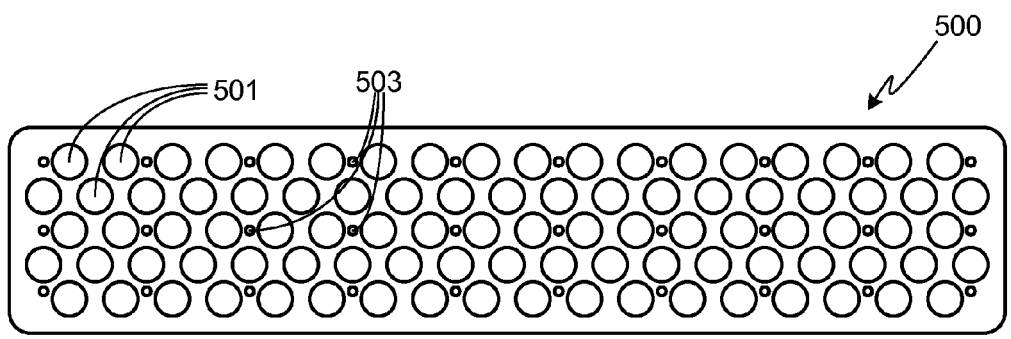
FIG. 5 illustrates a complete housing member that is complementary to the housing member shown in FIG. 4.

FIGS. 4 and 5 illustrate two complementary housing members 400 and 500, respectively. In the illustrated configuration, the final battery pack would house 92 cells, the end portions of the cells being contained within cell wells 401 and 501. Also shown in FIGS. 4 and 5 are raised encapsulant injection ports 403 and 503, respectively. Note that raised ports 403 and 503 are offset from one another to ensure that during encapsulant injection the encapsulant does not pass through both ports. As previously noted, the layout of a battery pack in accordance with the invention can utilize other numbers of cells and ports, as well as other cell/port layouts.

Figure 6:
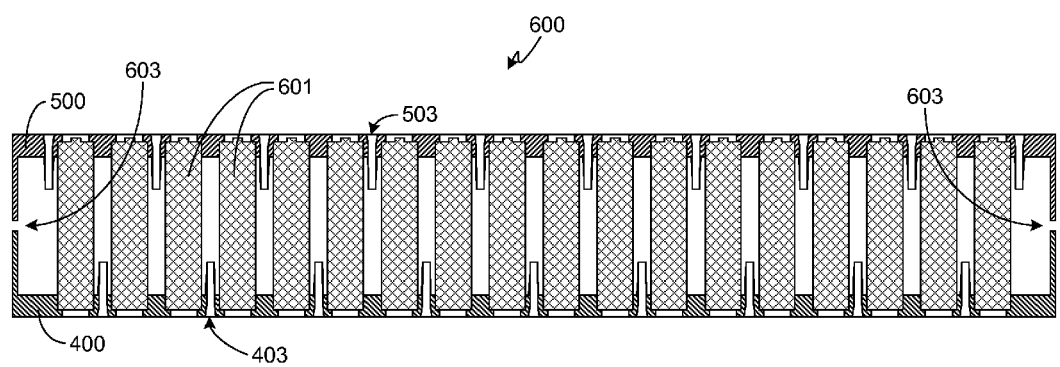
FIG. 6 is a cross-sectional view of a battery pack assembly in accordance with the invention.

It will be appreciated that the present invention lends itself to both manual and automated battery pack manufacturing processes. For example, in one preferred process all of the battery cells are inserted into the corresponding cell wells within the first housing member, for example a housing member 400 such as that illustrated in FIG. 4. Once the cells are properly seated within the cell mounting wells of the housing member, a complementary housing member (e.g., member 500) is positioned over the cells such that the second end of each cell is inserted within the corresponding cell wells of the complementary housing member. FIG. 6 is a cross-sectional view of such a battery pack 600. As shown, cells 601 are positioned within the cell wells of the lower and upper housing members as described above. Also as described above, raised encapsulant fill ports 403 and 503 are offset from one another.

Figure 7:
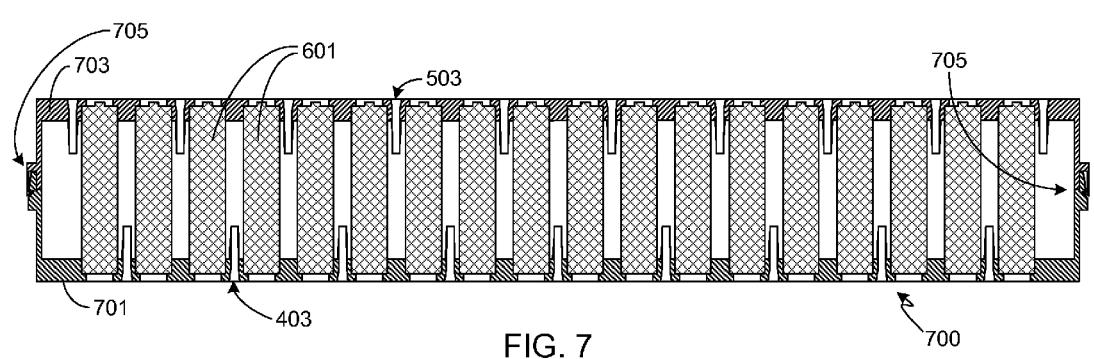
FIG. 7 is a cross-sectional view of an alternate battery pack assembly in accordance with the invention.

In battery pack 600 shown in FIG. 6, after battery pack assembly there remains a gap 603 between housing members 400 and 500. As a result of this configuration, cells 601 are the primary source of battery pack structural integrity. It should be understood that other configurations can also be used with the invention. For example, battery pack 700, shown in cross-section in FIG. 7, is similar to that shown in FIG. 6 except that lower housing member 701 is in contact with upper housing member 703. In this configuration, one or more latching mechanisms 705 are used to secure the two members together, although it will be appreciated that once encapsulant has been added to the structure, latches 705 add little structural rigidity to that achieved via the cells. In addition to using any of a variety of different latching mechanisms, other means can be used to secure the two housing members together. For example, the mating surfaces of the housing members can be ultrasonically welded together, or bonded together with a suitable adhesive.

Once a battery pack such as battery pack 700 or 800 is assembled, encapsulant is added. Although encapsulant can be added manually, preferably the encapsulant is added through an automated system. For example, a mounting jig can be used to hold the assembly in place and an automated system with multiple injection needles, corresponding to the port configuration, can be used to introduce the encapsulant into the battery pack.

Figure 8:
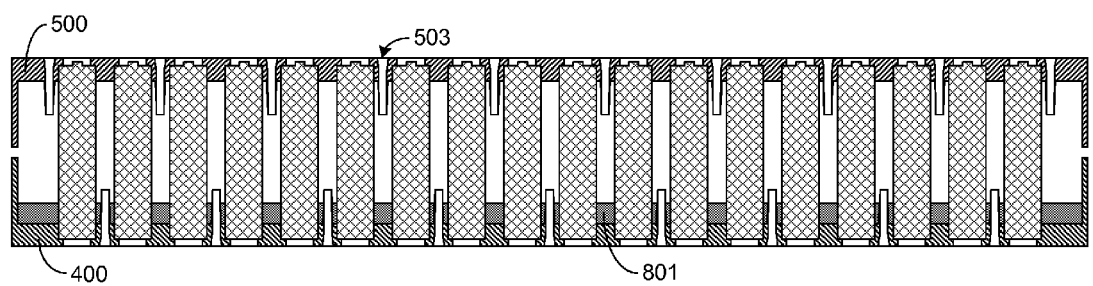
FIG. 8 is a cross-sectional view of the battery pack shown in FIG. 6 after injection of the first layer of encapsulation material.
Figure 9:
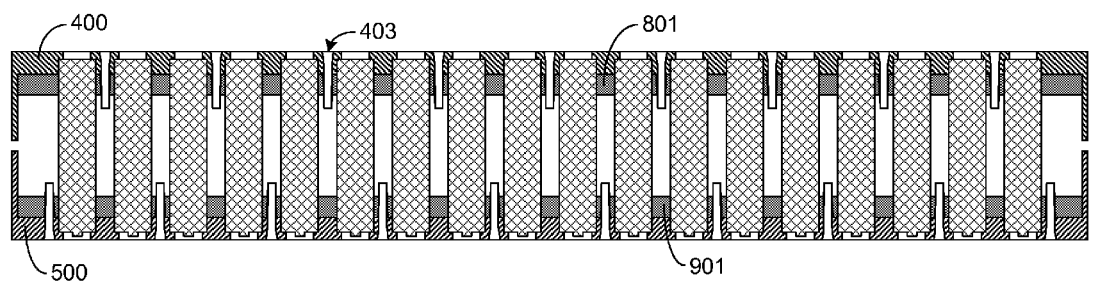
FIG. 9 is a cross-sectional view of the battery pack shown in FIG. 8 after the assembly has been rotated and the second layer of encapsulation material has been injected into the assembly.

FIG. 8 is a cross-sectional view of battery pack 700 after encapsulant 801 has been injected into the assembly through encapsulant fill ports 503. Preferably encapsulation material 801 is simultaneously introduced through all ports 503. Alternately, the encapsulation material can be injected serially through the ports. The encapsulant then flows throughout the bottom surface of member 400, surrounding the end portion of each cell 601 so that all cells 601 are held in place. After encapsulant 801 has sufficiently hardened within housing member 400, the battery pack is flipped over as shown in FIG. 9 and encapsulation material 901 is added through encapsulant injection ports 403. If the pattern of encapsulant injection ports is the same for both housing members, then, as preferred, the same injection manifold can be used to add encapsulant to both housing members. After both housing members have been attached to the cells via the two encapsulation layers and both layers of encapsulant have sufficiently cured, the battery pack is ready for wiring, testing and use.

In the preferred manufacturing process, and as described above, the battery pack is assembled prior to adding encapsulation material to either housing member. In an alternate manufacturing process, the cells are positioned into the lower housing member and encapsulation material is added thereby fixing the cells into place before the upper housing member is fit over the second end of the cells. Once the upper housing member is in position and the cells are properly inserted into the upper housing member cell wells, the assembly can be flipped over and encapsulant added to fix the cells to the second housing member. A disadvantage of this approach, however, is that a cell may be out of alignment when it is bonded to the lower housing member, thereby preventing a straightforward integration of the cells into the upper housing member. Of course this problem can be avoided through the use of accurate mounting jigs. It will be appreciated that if the alternate manufacturing process is used, raised encapsulation ports are only required on one of the housing members, i.e., the lower housing member, as the first injection of encapsulant is performed without the upper housing member being in place.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack, comprising:
    a first housing member having a first housing member interior surface defining an interior region of said battery pack, wherein said first housing member interior surface includes a first plurality of cell mounting wells, wherein each cell mounting well of said first plurality of cell mounting wells is adapted to receive a first end of a corresponding battery cell, wherein said first housing member interior surface further includes at least one first housing member raised encapsulant injection port, wherein said at least one first housing member raised encapsulant injection port includes an extended portion that extends above said first housing member interior surface and further into said interior region of said battery pack;
    a second housing member complementary to said first housing member and having a second housing member interior surface that further defines said interior region of said battery pack, wherein said second housing member interior surface includes a second plurality of cell mounting wells, wherein each cell mounting well of said second plurality of cell mounting wells is adapted to receive a second end of said corresponding battery cell, wherein said second housing member interior surface further includes at least one second housing member raised encapsulant injection port, wherein said at least one second housing member raised encapsulant injection port includes an extended portion that extends above said second housing member interior surface and further into said interior region of said battery pack;
    a plurality of battery cells, wherein each battery cell of said plurality of battery cells includes said first end for insertion into each cell mounting well of said first plurality of cell mounting wells, and wherein each battery cell of said plurality of battery cells includes said second end for insertion into each cell mounting well of said second plurality of cell mounting wells;

a first layer of encapsulation material surrounding the perimeter of said first end of each battery cell, wherein an end section of said extended portion of said at least one first housing member raised encapsulant injection port extends beyond said first layer of encapsulation material, and wherein said at least one first housing member raised encapsulant injection port remains open after inclusion of said first layer of encapsulation material within said battery pack; and a second layer of encapsulation material surrounding the perimeter of said second end of each battery cell, wherein an end section of said extended portion of said at least one second housing member raised encapsulant injection port extends beyond said second layer of encapsulation material, and wherein said at least one second housing member raised encapsulant injection port remains open after inclusion of said second layer of encapsulation material within said battery pack.

2. The battery pack of claim 1, wherein said first layer of encapsulation material covers said first housing member interior surface, and wherein said second layer of encapsulation material covers said second housing member interior surface.

3. The battery pack of claim 1, wherein said first housing member interior surface is chamfered at the intersection of each of said first plurality of cell mounting wells and said first housing member interior surface, and wherein said second housing member interior surface is chamfered at the intersection of each of said second plurality of cell mounting wells and said second housing member interior surface.

4. The battery pack of claim 1, wherein each of said first plurality of cell mounting wells further comprises at least one through hole.

5. The battery pack of claim 4, wherein each of said second plurality of cell mounting wells further comprises at least one through hole.

6. The battery pack of claim 1, wherein said first and second housing members further comprise at least one latching mechanism, wherein said at least one latching mechanism secures said first housing member to said second housing member.

7. The battery pack of claim 1, wherein a gap is present between said first housing member and said second housing member.

8. The battery pack of claim 1, wherein said first housing member is bonded to said second housing member.

9. A battery pack, comprising:

a first housing member having a first housing member interior surface defining an interior region of said battery pack, said first housing member interior surface comprising a first plurality of cell constraints, wherein each cell constraint of said first plurality of cell constraints is adapted to receive a first end of at least one corresponding battery cell, said first housing member interior surface further comprising a plurality of first housing member raised encapsulant injection ports, wherein each of said plurality of first housing member raised encapsulant injection ports includes an extended portion that extends above said first housing member interior surface and further into said interior region of said battery pack;

a second housing member complementary to said first housing member and having a second housing member interior surface that further defines said interior region of said battery pack, said second housing member interior surface comprising a second plurality of cell constraints, wherein each cell constraint of said second plurality of cell constraints is adapted to receive a second end of said at least one corresponding battery cell;

a plurality of battery cells constrained by said first plurality of cell constraints and by said second plurality of cell constraints;

a first layer of encapsulation material surrounding the perimeter of said first end of each battery cell, wherein an end section of said extended portion of each of said plurality of first housing member raised encapsulant injection ports extends beyond said first layer of encapsulation material, and wherein each of said plurality of first housing member raised encapsulant injection ports remains open after inclusion of said first layer of encapsulation material;

a second layer of encapsulation material surrounding the perimeter of said second end of each battery cell;

said second housing member interior surface further comprising a plurality of second housing member raised encapsulant injection ports, wherein each of said plurality of second housing member raised encapsulant injection ports includes an extended portion that extends beyond said second housing member interior surface and further into said interior region of said battery pack, wherein an end section of said extended portion of each of said plurality of second housing member raised encapsulant injection ports extends above said second layer of encapsulation material, and wherein each of said plurality of second housing member raised encapsulant injection ports remains open after inclusion of said second layer of encapsulation material.

10. The battery pack of claim 9, wherein said first layer of encapsulation material covers said first housing member interior surface, and wherein said second layer of encapsulation material covers said second housing member interior surface.

11. The battery pack of claim 9, wherein said first plurality of cell constraints is comprised of a first plurality of cell mounting wells, and wherein said second plurality of cell constraints is comprised of a second plurality of cell mounting wells.

12. The battery pack of claim 11, wherein said first housing member interior surface is chamfered at the intersection of each of said first plurality of cell mounting wells and said first housing member interior surface, and wherein said second housing member interior surface is chamfered at the intersection of each of said second plurality of cell mounting wells and said second housing member interior surface.

13. The battery pack of claim 9, wherein said first and second housing members further comprise at least one latching mechanism, wherein said at least one latching mechanism secures said first housing member to said second housing member.

14. The battery pack of claim 9, wherein a gap is present between said first housing member and said second housing member.

* * * * *